(12) United States Patent
Greisiger et al.

(10) Patent No.: US 11,421,125 B2
(45) Date of Patent: Aug. 23, 2022

(54) MARKING COMPOSITION

(71) Applicants: FRAUNHOFER-GESELLSCHAFT ZUR FÖRDERUNG DER ANGEWANDTEN FORSCHUNG E.V., Munich (DE); Deutsche Institute für Textil- und Faserforschung Denkendorf, Denkendorf (DE)

(72) Inventors: Heinz Greisiger, Munich (DE); Thadeus Schauer, Neuhengstett (DE); Marc Entenmann, Fellbach (DE); Henry Lehman, Sindelfingen (DE); Reinhold Schneider, Goppingen (DE)

(73) Assignees: DEUTSCHE INSTITUTE FÜR TEXTIL- UND FASERFORSCHUNG DENKENDORF, Denkendorf (DE); FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/745,211

(22) Filed: Jan. 16, 2020

(65) Prior Publication Data
US 2020/0291254 A1    Sep. 17, 2020

Related U.S. Application Data

(63) Continuation of application No. 14/763,063, filed as application No. PCT/EP2014/051276 on Jan. 22, 2014, now Pat. No. 10,584,259.

(30) Foreign Application Priority Data

Jan. 23, 2013 (DE) .......................... 102013100662.0

(51) Int. Cl.
C09D 11/50         (2014.01)
B42D 25/00         (2014.01)
(Continued)

(52) U.S. Cl.
CPC ............... *C09D 11/50* (2013.01); *B41M 3/14* (2013.01); *B42D 25/00* (2014.10); *B42D 25/23* (2014.10);
(Continued)

(58) Field of Classification Search
CPC ........ C09D 5/32; C09D 11/037; C09D 11/50; C09D 11/102; G06K 19/06037;
(Continued)

(56) References Cited

U.S. PATENT DOCUMENTS 8,157,905 B2    4/2012   Lewis et al.
10,584,259 B2*  3/2020   Greisiger ............... D06M 11/83
(Continued)

FOREIGN PATENT DOCUMENTS

CN    101313316 A    11/2008
CN    101316906 A    12/2008
(Continued)

OTHER PUBLICATIONS

BR Office Action in Brazilian Application No. BR112015017608.9, dated Oct. 9, 2019, 9 pages.
(Continued)

*Primary Examiner* — Bijan Ahvazi
(74) *Attorney, Agent, or Firm* — Crowell & Moring LLP

(57) ABSTRACT

The invention relates to a marking composition, by means of which better protection of goods than hitherto available can be achieved independently of the coloring of the goods. The marking composition comprises an infrared-absorbing particulate component and carbon derivative, wherein the
(Continued)

Figure 1:
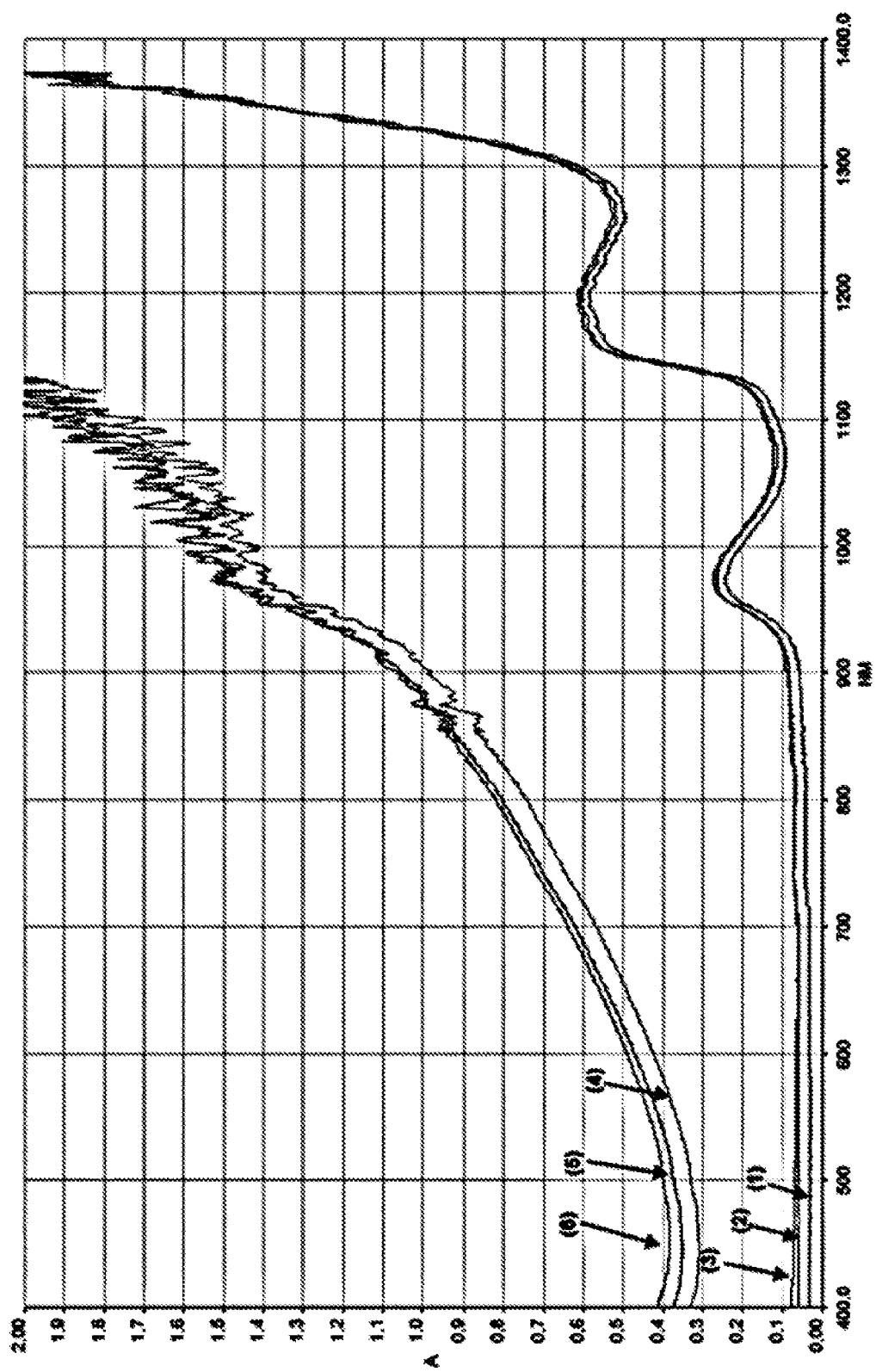

weight ratio of infrared-absorbing component to carbon derivative is in the range of approx. 10:1 to approx. 10,000:1.

14 Claims, 4 Drawing Sheets

(51) Int. Cl.
| | |
|---|---|
| B41M 3/14 | (2006.01) |
| D06H 1/02 | (2006.01) |
| D06Q 1/04 | (2006.01) |
| D06P 1/00 | (2006.01) |
| B42D 25/405 | (2014.01) |
| B42D 25/30 | (2014.01) |
| B42D 25/29 | (2014.01) |
| B42D 25/23 | (2014.01) |
| B42D 25/382 | (2014.01) |
| C09D 11/037 | (2014.01) |
| G07D 7/12 | (2016.01) |
| C09D 11/102 | (2014.01) |
| D06M 11/44 | (2006.01) |
| D06M 11/49 | (2006.01) |
| D06M 11/83 | (2006.01) |
| D06M 11/74 | (2006.01) |
| D06P 5/30 | (2006.01) |
| D06P 1/44 | (2006.01) |
| D06M 11/47 | (2006.01) |
| D06H 1/00 | (2006.01) |
| C09D 5/32 | (2006.01) |
| G06K 19/06 | (2006.01) |

(52) U.S. Cl.
CPC .............. *B42D 25/29* (2014.10); *B42D 25/30* (2014.10); *B42D 25/382* (2014.10); *B42D 25/405* (2014.10); *C09D 5/32* (2013.01); *C09D 11/037* (2013.01); *C09D 11/102* (2013.01); *D06H 1/00* (2013.01); *D06H 1/02* (2013.01); *D06M 11/44* (2013.01); *D06M 11/47* (2013.01); *D06M 11/49* (2013.01); *D06M 11/74* (2013.01); *D06M 11/83* (2013.01); *D06P 1/004* (2013.01); *D06P 1/0076* (2013.01); *D06P 1/44* (2013.01); *D06P 5/30* (2013.01); *D06Q 1/04* (2013.01); *G06K 19/06037* (2013.01); *G07D 7/12* (2013.01)

(58) Field of Classification Search
CPC ........ B42D 25/00; B42D 25/23; B42D 25/29; B42D 25/30; B42D 25/382; B42D 25/405; B41M 3/14; G07D 7/12; D06M 11/44; D06M 11/47; D06M 11/49; D06M 11/74; D06M 11/83; D06H 1/00; D06H 1/02; D06Q 1/04; D06P 1/004; D06P 1/0076; D06P 5/30; D06P 1/44

See application file for complete search history.

(56) References Cited

U.S. PATENT DOCUMENTS

| | | |
|---|---|---|
| 2005/0064152 A1 | 3/2005 | Aylward et al. |
| 2005/0156318 A1* | 7/2005 | Douglas ................ G06K 19/18 |
| | | 257/761 |
| 2007/0082963 A1 | 4/2007 | Bhatt |
| 2007/0119950 A1 | 5/2007 | Auslander |
| 2008/0138632 A1 | 6/2008 | Leenders |
| 2008/0145777 A1 | 6/2008 | Iftime |
| 2009/0117278 A1 | 5/2009 | Sadohara |
| 2012/0023458 A1 | 1/2012 | Chaudhri et al. |
| 2012/0234581 A1* | 9/2012 | Ivanov .................. H05K 1/095 |
| | | 174/255 |
| 2016/0137863 A1 | 5/2016 | Greisiger et al. |

FOREIGN PATENT DOCUMENTS

| | | |
|---|---|---|
| CN | 102267299 A | 12/2011 |
| EP | 0663429 B1 | 6/2000 |
| EP | 0997503 B1 | 6/2005 |
| EP | 1790701 | 5/2007 |
| EP | 1670868 B1 | 2/2008 |
| JP | 2005025970 | 1/2005 |
| JP | 2008-110606 | 5/2008 |
| JP | 2009-155570 | 7/2009 |
| WO | WO 2004/003070 | 1/2004 |
| WO | WO 2007/132214 | 11/2007 |
| WO | WO 2014/114690 | 7/2014 |

OTHER PUBLICATIONS

International Search Report & Written Opinion in International Application No. PCT/EP2014/051276, dated Apr. 4, 2014, 10 pages (with English translation).

* cited by examiner

MARKING COMPOSITION

The invention refers to a marking composition, in particular for marking textiles.

The protection of trademarks and products by means of visually visible markings, particularly by means of so-called data matrix codes, applied by means of laser marking methods for example, has been known for some time. However, this method has the disadvantage that a product counterfeiter is able to immediately recognize both the location of the application and the code itself.

Secure markings to protect high-value merchandise from plagiarism are becoming increasingly important in view of the worldwide increase in globalization and the interconnectedness of markets. On the one hand, counterfeit products cause significant financial damages which in some areas, such as the textile industry, can threaten the existence of small to medium-size companies and economic centers.

On the other hand, counterfeit products frequently cause safety issues, in that, for example, counterfeit children's toys may contain hazardous substances that present health risks, or the permitting agency's official safety-related seals of approval are simply falsified.

There are several ways to obtain invisible security markings. One approach that is already in use is the utilization of photochromic substances, such as fluorophores that, when irradiated with ultraviolet light, emit a specific color in the visible range, or especially in the near infrared range. The following is a description of the most important approaches already in use that employ photochromic substances.

EP 1 670 868 B1 describes fluorescent dyes, or inks, containing so-called carbon nanotubes (CNT) that are primarily used for security applications. When irradiated with light of the 671 nm wavelength, the applied inks fluoresce, emitting irradiation in the near infrared range. In the visual range, the applied inks are less visible, but may be detected by means of a suitable near infrared camera.

According to EP 0 997 503 B1, merchandise is treated with inks that are invisible to the viewer under a light from the visible spectrum, and do not fluoresce after irradiation with light from a different, shorter wavelength. This makes the markings or images applied using this ink visible and detectable.

Among other advantages, the inks described in EP 0 997 503 B1 are marked by high print quality, excellent fastness to light and water, excellent fluorescent intensity during irradiation with a suitable light source, and a high degree of reliability in connection with ink jet printer systems.

EP 0 663 429 B1 describes security inks invisible to the naked eye that can be made visible by irradiation with light in the infrared range. The fluorophore is a phthalocyanine dye in a binder matrix, preferably of carnauba wax.

The above-described security markings of EP 1 670 868 B1, EP 0 997 503 B1, and EP 0 663 429 B1 which use fluorescent materials are, as a rule, unsuitable for applying security markings on textiles because they would be visible to some extent under intense sunlight. Similarly, fluorescence in the near infrared range would tend to be less suitable because of the self-absorption of the background, which results in the security marking producing insufficient contrast in the case of many dark-colored or black substrates, or any kind where the substrate is dyed blue with cu-phthalocyanines, for example.

Another disadvantage of these photochromic or fluorophoric substances is that they are often unstable when exposed to ultraviolet light, making their durability in external applications such as clothing and technical textiles doubtful.

US 2007/0082963 A1 describes infrared absorptive inks containing, among others, antimony-doped tin oxide (ATO) and characterized by their only slightly visible color and a high rate of infrared absorption.

WO 2007/132214 A1 also describes such types of ink. However, it was only partly possible to confirm that, when nanoscale materials consisting of doped tin oxides are used, inks that are transparent and absorbent in the infrared range of light are obtained. Contrasts detectable in the near infrared range, such as described in WO 2007/132214 A1 are exclusively based on absorption effects. Imprints with inks of this type are detectable as dark-appearing markings on a somewhat lighter background, i.e., there is only a slight near infrared absorption.

As already described in WO 2007/132214 A1, these near infrared contrasts are highly dependent on the background color and material. The resulting markings of such inks are therefore more likely to be sufficiently rich in contrast and partly decodable if the substrates are light in color, while for example blue backgrounds dyed with cu-phthalocyanines and darker or even black substrates in general often provide no contrasts that are sufficient for decoding.

Similarly, inks that contain only the infrared-absorbing semiconductor materials described in WO 2004/003070 A1 or the tin oxide compounds described in DE 198 46 096 A1, or pigments in general that absorb in the near infrared range, regardless of their particle size, can therefore not be used across the board on diverse backgrounds for decodable markings.

To date, inks of the kind that contain only nanoscale, infrared-absorbing materials, for example, are seldom used to protect branded goods, such as high-value textiles. The reason is that the requirement for permanent markings, visual invisibility, and the contrasts necessary to allow for decoding the markings on backgrounds that are dyed in diverse colors cannot be adequately met.

It is an object of this invention to propose a marking composition by means of which better protection of goods than hitherto available can be achieved, regardless of the coloring of the goods.

This problem is solved by means of a marking composition according to claim 1.

The marking composition described in this invention allows markings to be produced that are not visually noticeable, yet are easy to detect, especially on textiles.

Markings that are visually undetectable, but which can be seen and decoded by detection in a specific wavelength range of the infrared spectral range by using an appropriate camera for example, represent a suitable solution for security markings of any kind.

The markings that can be produced by means of the marking compositions described in this invention, while unnoticeable in the visual spectral range and particularly when they appear transparent, are especially advantageous when it comes to applying security markings on textiles.

In addition, the growing demand for invisible, hidden security features on banknotes, identification documents and credit cards can be met by means of the marking composition of this invention, thus ensuring protection against forgeries in the future, as well as preventing entry into the country by undesirable individuals.

In this way, the invention meets the growing demand in the western industrial nations where there is strong interest in being able to apply markings to products in a way that is as easy and as cost-effective as possible, yet invisible. The authorities, for example, can then identify and record these markings by means of special scanners, and send the codes to certain data banks for decoding. This allows the authorities to act in a timely and efficient fashion to protect the population, the movement of goods, and the economy.

The disadvantageous aspects of visual detectability in the current state of the art, and the fact that current methods of security marking are not universally suitable for differently dyed backgrounds, are avoided within the framework of the present invention by a mixture of particulate infrared absorbers and carbon derivatives.

Surprisingly, when suitably stimulated, the marking composition described in this invention revealed enhanced synergistic emission effects in the far infrared range (FIR).

The preferred choice for stimulation is a light-emitting source that offers a greater portion of near infrared irradiation at a wavelength of up to approximately 2 µm.

For detection in the near infrared range (NIR), as previously explained, an essential role is played mainly by the absorptive differences in this wavelength range between background and marking for the contrasts obtained, but this is different for markings where detection is in the far infrared range (FIR). For detection in the far infrared range, the absorption for the stimulation wavelength, which as a rule differs dramatically from the wavelength of detection, the heat conductivity, and especially the emissivity all play an essential role. Since most dyes used to color goods, and generally all light-dark differences are based on the principle of absorption, the detection of markings that absorb in the near infrared range will always be strongly dependent on the coloring of the substrate being marked.

This problem is lessened for markings that emit and are detectable in the far infrared range (FIR). Here it is possible, as already explained, not only to maximize various parameters for achieving optimal contrasts against the background, but also to take advantage of the differences between the irradiation and detection wavelengths, which in practice significantly simplifies the technical realization of detection and decoding of visually invisible markings.

For traditional detection in the near infrared range, however, stimulation must, for known reasons be frequently applied in this light range, i.e., prior to detection the stimulation must be chronologically staggered by applying light flashes.

For different materials, backgrounds, and color dyes, and due to varying absorption properties, it has hitherto been necessary to systematically optimize and synchronize with each other both the intensity of the stimulation and the timeframe of the subsequent detection, as well as, in most cases, the marking itself. This is difficult to do and may in practice be achieved only by expending relatively significant technical efforts.

The traditional detection and decoding of near infrared markings would thus require a significant level of technical knowledge on the part of the individual charged with the job in order to exclude detection errors. It seems almost unimaginable that a near infrared detection method with automatic decoding, as disclosed in WO 2007/132214 A1, could perform reliably in practice when used by the authorities in the field during rapid and robust deployment.

Surprisingly, it has been found in this invention that when certain heterogeneous substances consisting of a particulate mix of an infrared absorber and a carbon derivative are subjected to appropriate light stimulation in the near infrared range, they present the expected integral and additive contrast properties of both substance components, while an unexpected reciprocal intensification and a marked synergistic effect with regard to contrast expression is produced in the far infrared range. The weight ratio of infrared-absorbing components to the carbon derivative can be varied within wide limits from approx. 10:1 to approx. 10,000:1. Markings that appear transparent and are particularly unnoticeable become possible when the weight ratio is between approx. 100:1 and approx. 10,000:1.

The mixture preferably takes the form of a finely dispersed, particulate mix.

The mixture of this invention can be dispersed into a liquid that, in particular, can be of low viscosity and may additionally contain organic components, particularly a polymeric binder component. In this way, the heterogeneous mixtures of this invention can be applied to objects and goods, in particular textiles, in order to achieve visually invisible markings by the appropriate application of print, lacquering, and coatings of any kind.

If the appliqued area is dry, a thin layer of solid material, [or] an appropriate polymer matrix when a polymeric binder is used, containing the finely dispersed mixture of particulate infrared absorbers and carbon derivatives described in this invention, is obtained.[1]

[1] This is a grammatically deficient, extremely awkward German sentence, and the translation may not be accurate. -Translator's note.

In principle, a direct application in plastics, particularly in thermoplastic plastics, is also conceivable when the marking composition of this invention is dispersed into the melting process, and/or by mixing it into melted plastics as an appropriate solvent preparation.

The infrared-absorbing component used according to this invention can, in particular, be chosen from inorganic materials, with preference given to the material classes of oxides, sulfides, and selenides of tin, zinc, antimony, indium, molybdenum, tungsten, bismuth, as well as their mixed compounds.

A tin oxide doped with indium, antimony or fluorine is particularly preferred. The preferred doping content is approx. 0.25 to approx. 15 weight-% in relation to the weight of the doped tin oxide.

The carbon derivative as the second of the two components of the marking composition described in this invention is preferably chosen from allotropic forms of the carbon element, such as soot, graphite, fullerenes and so-called carbon nanotubes, their derivatives, and mixtures of the aforementioned carbon derivatives.

In particular, the weight ratio of the infrared-absorbing component to the carbon derivative is set between approx. 25:1 and approx. 10,000:1; preferably between approx. 50:1 and approx. 5,000:1; more preferably between 80:1 and approx. 2,000:1; and most preferably between approx. 100:1 and approx. 2,000:1.

The particle size in the marking composition described in the invention is preferably chosen in such a way that the characteristic value of the particle size $d_{50}$ of the infrared-absorbing component is approximately 500 nm or less; in particular approx. 100 nm or less; more preferred approx. 70 nm or less; and most preferably approx. 50 nm or less.

The carbon derivative is preferably present in the form of nanoparticles that extend in at least one direction by approx. 100 nm or less.

In particular, as already discussed, the marking composition described in this invention can be formulated as a fluid mass, in which case it has a liquid component. According to a preferred variation of the invention, the fluid mass is formulated as water-based.

Alternatively, the marking composition of this invention, having a liquid component, can also be formulated as a paste.

An especially preferred formulation of the fluid mass takes the form of a low-viscosity liquid, particularly with a viscosity of approx. 25 mPa·s or less; preferably between approx. 0.5 and approx. 20 mPa·s, and most preferably with a viscosity between approx. 0.5 and approx. 5 mPa·s. The stated viscosity values relate to a shear gradient of $1s^{-1}$.

The marking composition of this invention, conceived as a fluid mass, contains in particular a solid material portion of the infrared-absorbing component of between approx. 0.01 and approx. 10 weight-%. A more preferable range is between approx. 0.05 and approx. 1 weight-%, and the most preferable is approx. 0.1 to approx. 0.5 weight-%.

Formulated as a fluid mass, the marking composition can comprise a liquid component in the form of a monomeric, oligomeric and/or polymeric organic component, where the concentration of the organic components in the marking composition ranges in particular between approx. 0.5 and approx. 30 weight-%. More preferable is a concentration of between approx. 1 and approx. 20 weight-%, and most preferable it ranges between approx. 2 and approx. 10 weight-%.

The organic components optionally utilized in the marking composition of this invention either as a paste or a fluid mass comprise preferably a compound with a molecular weight of approx. 300 to approx. 15,000 g/mol; more preferable approx. 500 to approx. 8,000 g/mol; and most preferable approx. 800 to approx. 6,000 g/mol.

The marking composition of this invention, formulated as a paste or fluid mass comprises preferably a liquid component with one or more polymers and/or copolymers chosen from the polymer classes of polyethers, polyvinyl alcohols, polyacrylates, polystyrenes, polyurethanes, polyvinyl caprolactams, cellulose and/or polyvinyl pyrrolidones.

Marking compositions formulated as fluid masses according to this invention have preferably and additionally approx. 0.001 to approx. 5 weight-%; in particular approx. 0.1 to approx. 1 weight-%; and most preferably approx. 0.3 to approx. 0.8 weight-% of a wetting, dispersing, and/or leveling additive.

As previously mentioned, the marking composition of this invention can be utilized in multiple ways.

One of the most important applications of the marking compositions of this invention is their use as a coating and ink formulation, particularly as an ink jet-printable ink formulation, preferably water-based.

A further important application of the marking composition of this invention is its use as an infrared-absorbing, transparent and visually unnoticeable coating composition and printable ink.

The marking compositions of this invention, when formulated as a paste or fluid mass are preferably designed to be thermosettable.

In particular, they are formulated as an infrared-hardening coating composition and printable ink, as described in WO 2004/003070 A1, or as an ultraviolet-hardening coating composition and printable ink, as already disclosed in EP 1 954 768 B1.

Thermosetting formulations are particularly preferred, in that they offer additional advantages compared to formulations that harden by means of irradiation (UV and IR).

In the case of curing by infrared irradiation, the water-based inks that are preferred for the marking compositions of this invention are frequently subject to reduced wetting of the binder formulation used to fix the marking due to the self-absorption of the water in this wavelength range. This negatively affects the permanence of the markings that is of such importance here.

Frequently, the reactive diluents used as liquid components also appear less than ideal for formulations containing the marking composition of this invention, especially in UV-curing systems, in that the preferred, finely dispersed mixtures of infrared absorbers and carbon derivatives prove to be unstable here and in particular exhibit a tendency to flocculate.

If it is not possible to ensure the finely dispersed mixing state of the carbon component and the infrared absorber, the applied markings lose contrast, transparency, and color neutrality and are no longer universally serviceable as invisible markings.

UV-curing systems having reactive diluents as formulation components are especially poorly suited for marking textiles due to the properties of the reactive diluents that sensitize and irritate the skin.

The marking composition of this invention is further preferred in the form of a watery ink formulation and not, as has been suggested in U.S. Pat. No. 8,157,905 B2, as an oleophilic composition, because in consideration of environmental matters, the use of solvents can be largely avoided.

The marking composition of this invention can serve for identification and marking purposes, as well as for applying security markings to objects of any kind, in particular for security markings on merchandise of any kind; it can be used for visually unnoticeable identification and legitimization features on banknotes, identification papers, and documents of any kind, and is also a preferred means for the security marking of textiles, compact disks, DVDs, computers, and consumer goods of all types.

The marking composition of this invention can be formulated as a mixture of solid materials, as a paste or a liquid of a particularly low viscosity, as a marking that is detectable and decodable in the infrared range, in the near infrared range at wavelengths of approx. 800 to approx. 2,500 nm, as well as in the far infrared range at wavelengths of approx. 2.5 to approx. 14 μm.

In particular, the marking compositions of this invention can also be embedded in a solid material, particularly an organic solid material, and preferably in a polymer matrix or a plastic material.

In this case, the preferred weight ratio of the marking composition of this invention is between approx. 0.1 and approx. 30 weight-%; more preferably it is between approx. 1 and approx. 20 weight-%, and the most preferred range is from approx. 3 to approx. 10 weight-%.

In the following, these and other advantages of the invention are explained by means of examples and drawings.

Figure 2:
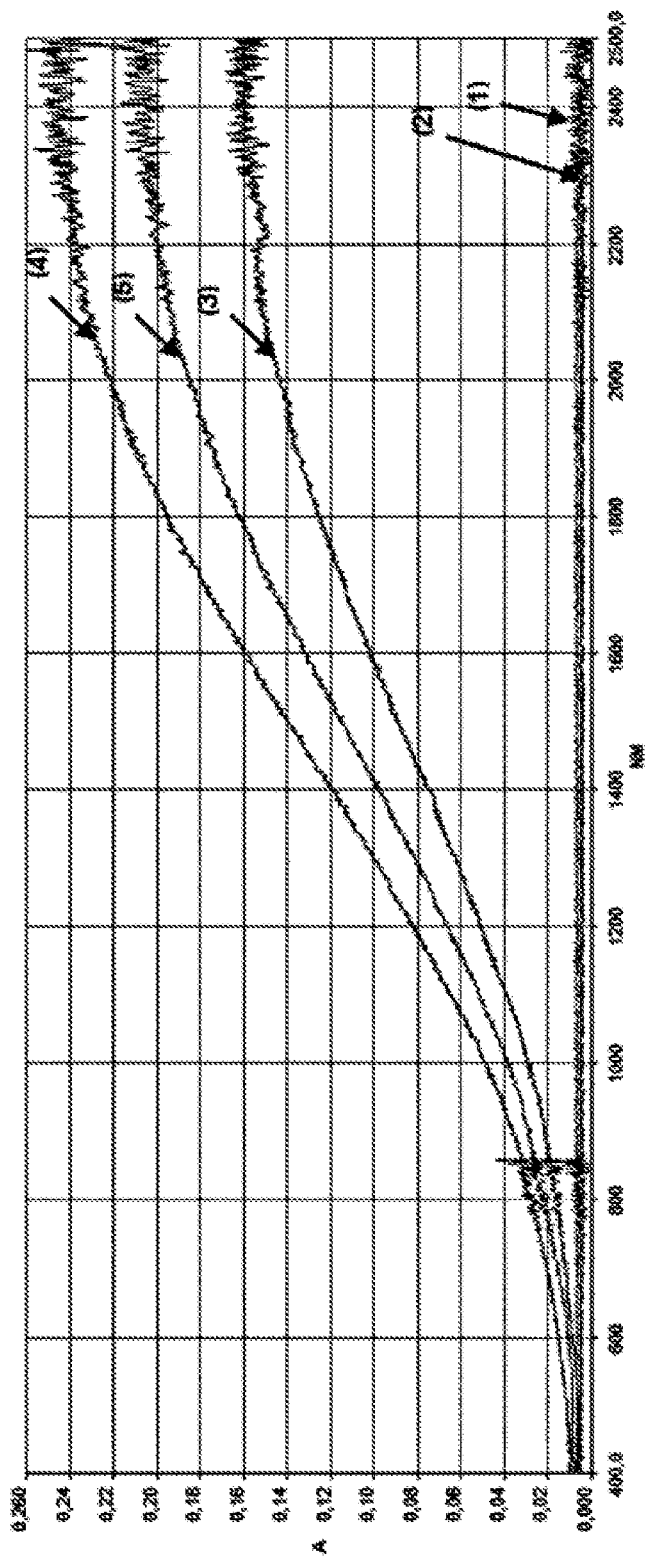
Figure 3:
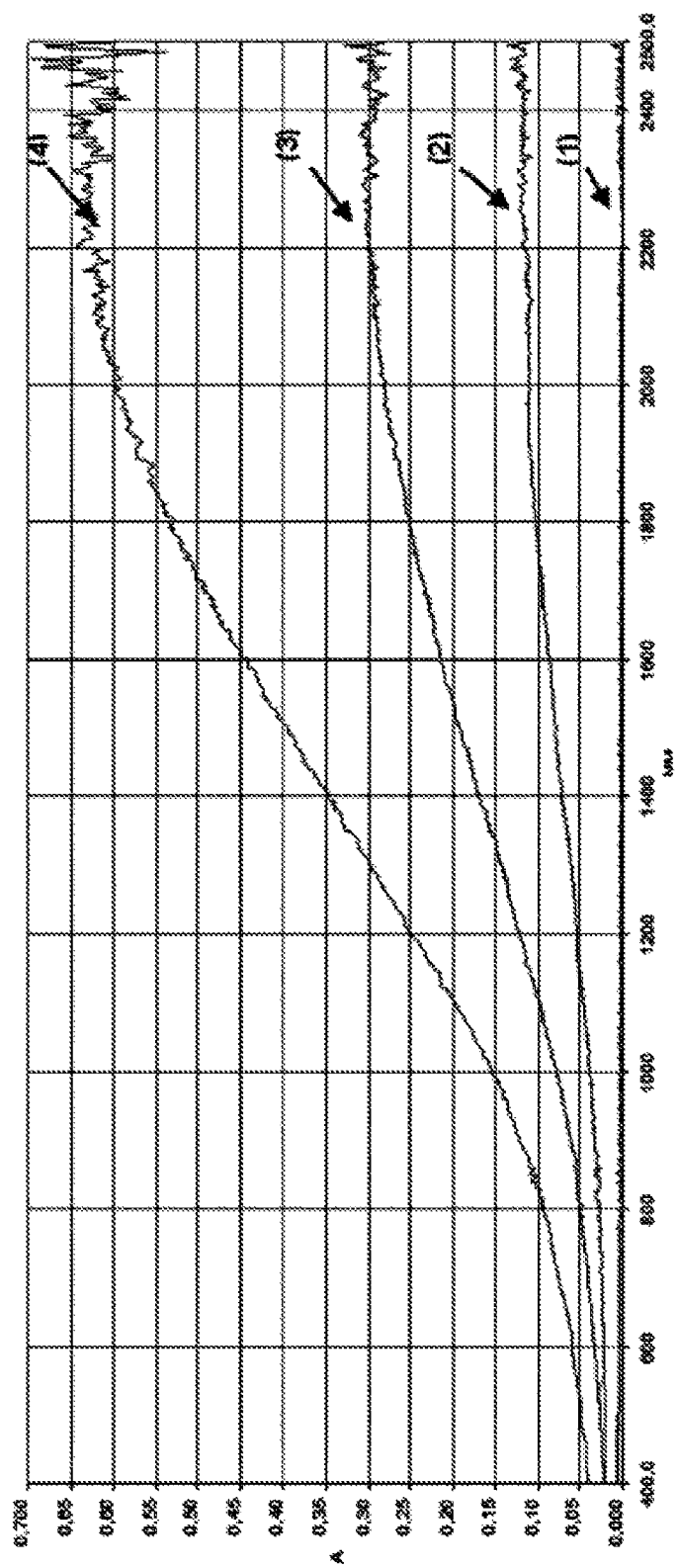
Figure 4:
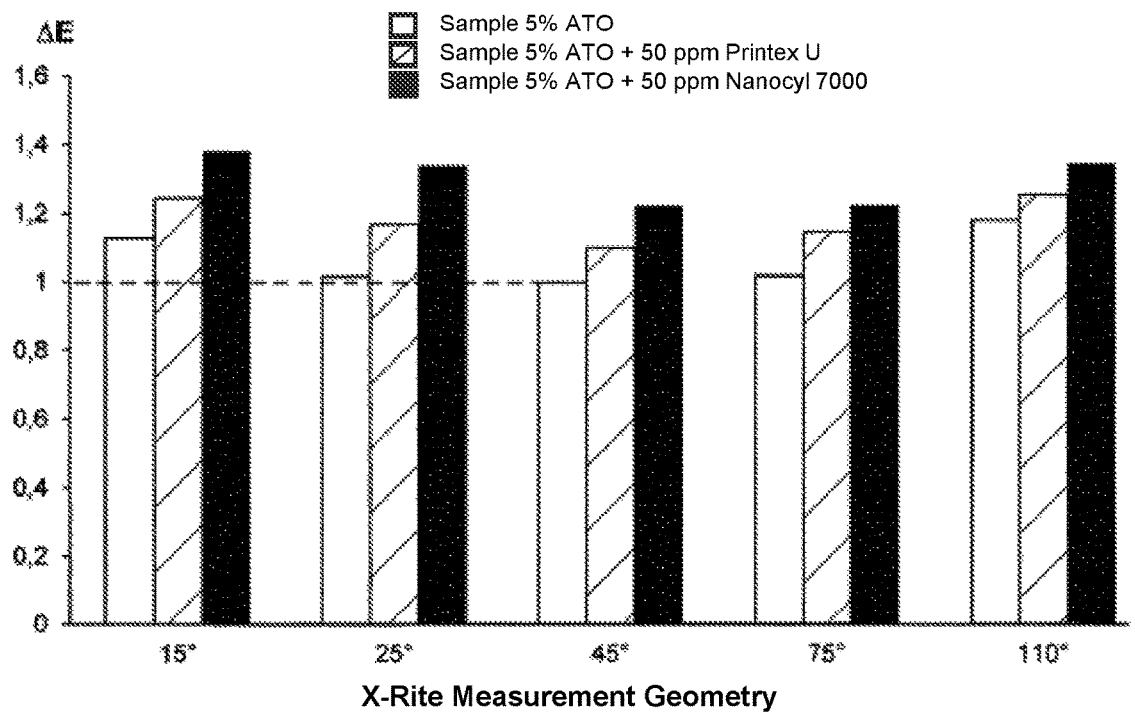

Specifically, the individual drawings show:

FIG. 1: UV-VIS-NIR absorption curves of a nanoscale antimony-doped tin oxide, soot, and CNT dispersion, as well as the marking compositions of this invention contained therein, all water-based;

FIG. 2: UV-VIS-NIR absorption curves of dried, antimony-doped tin oxide, soot, and CNT dispersions, as well as the dried marking compositions according to this invention;

FIG. 3: UV-VIS-NIR absorption curves of dried binder-containing ink preparations of the individual components and a marking composition according to this invention;

FIG. 4: Differences of chromatic color values measured and compared against blank white paper, measured at imprints of ink preparations having the nanoscale antimony-doped tin oxide component (white bar); of ink preparations containing the finely dispersed marking compositions according to this invention of the nanoscale antimony-doped tin oxide sample with soot (cross-hatched bar), as well as with carbon nanotubes (black bar); and FIG. 5: Percentage of color changes of the contrasts in the visual, near infrared, and far infrared range of detection for imprints of ink preparations with the nanoscale, antimony-doped tin oxide component (white bar), of ink preparations containing the finely dispersed marking compositions described in this invention of the nanoscale antimony-doped tin oxide sample with soot (cross-hatched bar), as well as carbon nanotubes (black bar).

EXAMPLES

The carbon derivative used in the following examples was lamp black in the form of Printex® U from Evonik Industries AG with an average primary particle size of 21 nm or so-called MWCNT (multi-walled carbon nanotubes) in the form of Nanocyl™ NC 7000 from Nanocyl S.A. with a mean tube diameter of 9.5 nm and a mean fiber length of 1.5 µm.

The infrared absorber employed was an antimony-doped tin oxide nanopowder (ATO), available from Sigma-Aldrich Co. under the order number 549541 as "antimony tin oxide, nanopowder", having a primary particle size smaller than 50 nm and an antimony oxide content in the range of 7 to 11 weight-%.

Prior to use, the infrared-absorbing component and the carbon derivative were dispersed by means of a nano mill. A dispersing agent and a wetting agent were added to the liquid formulations (25 weight-% of Disperbyk 190 from Byk-Chemie, in relation to the solid material content of the carbon and infrared-absorbing components) until a finely dispersed state with particle sizes of $d_{50}$ of approx. 70 nm or smaller was achieved. The particle sizes in a dispersion and thus the dispersed state of the dispersion were determined by utilizing methods of light diffusion.

The polymeric binder was used in Example 3 as a mixture of PVP K12 (polyvinyl pyrrolidone) from Sigma-Aldrich Co. and WALOCEL™ MW3600 (hydroxyethyl methyl cellulose) from Dow Wolff Cellulosics GmbH in a weight ratio of 1:1, formulated as a 0.02 weight-% solution in water.

The polymeric binder of the ink formulations of Example 4 was available as an aqueous binder dispersion. To this effect, hydrosol 900 (a 35 weight-% watery styrene acrylate copolymer dispersion from Lefatex-Chemie GmbH) was diluted with water to arrive at an approx. 10 weight-% solid material ratio of the polymeric binder (styrene acrylate copolymer).

Example 1

Comparison of the UV-VIS-NIR absorption of a nanoscale antimony-doped tin oxide, soot, and CNT dispersion, as well as the mixtures thereof according to this invention, in water FIG. 1 shows a comparison of the UV-VIS-NIR absorption A of a nanoscale antimony-doped tin oxide, soot, and CNT dispersion, as well as the mixtures thereof according to this invention, in water.

The absorption curves shown refer to the following dispersions:

Absorption curve (1): distilled water
Absorption curve (2): aqueous dispersion with approx. 0.001 weight-% lamp black
Absorption curve (3): aqueous dispersion with approx. 0.001 weight-% MWCNT
Absorption curve (4): aqueous dispersion with approx. 0.05 weight-% nanoscale, antimony-doped tin oxide (ATO) ($d_{50}$ approx. 66 nm)
Absorption curve (5): aqueous dispersion with approx. 0.001 weight-% lamp black and approx. 0.05 weight-% nanoscale, antimony-doped tin oxide (ATO) ($d_{50}$ approx. 66 nm)
Absorption curve (6): aqueous dispersion with approx. 0.001 weight-% MWCNT and approx. 0.05 weight-% nanoscale, antimony-doped tin oxide (ATO) ($d_{50}$ approx. 66 nm)

As can be seen, the addition of the nanoscale, antimony-doped tin oxide has a significant impact on the absorption characteristics of the dispersion in water under UV-VIS-NIR, but the two carbon derivatives lamp black and MWCNT influence them only slightly in this wavelength range.

Example 2

Comparison of the UV-VIS-NIR absorptions of dried antimony-doped tin oxide, soot, and CNT dispersions, as well as the dried mixtures according to this invention FIG. 2 shows a comparison of the UV-VIS-NIR absorption A of dried antimony-doped tin oxide, soot, and CNT dispersions with the dried mixtures according to this invention. Here the absorption curves refer to the following solid materials and/or solid material compositions:

Absorption curve (1): approx. 50 µl of a dried lamp black dispersion from Example 1 on quartz glass (coating thickness approx. 700 nm)
Absorption curve (2): approx. 50 µl of a dried MWCNT dispersion from Example 1 on quartz glass (coating thickness approx. 700 nm)
Absorption curve (3): approx. 50 µl of a dried antimony-doped tin oxide (ATO) dispersion from Example 1 on quartz glass (coating thickness approx. 700 nm)
Absorption curve (4): approx. 50 µl of a dried mixture according to this invention of the lamp black and nanoscale, antimony-doped tin oxide (ATO) dispersions from Example 1 on quartz glass (coating thickness approx. 700 nm)
Absorption curve (5): approx. 50 µl of a dried mixture according to this invention of the MWCNT and nanoscale, antimony-doped tin oxide (ATO) dispersions from Example 1 on quartz glass (coating thickness approx. 700 nm)

On examination of the UV-VIS-NIR spectrums of the solid materials obtained by drying the dispersions from Example 1, it may be seen that, according to this invention, the finely dispersed addition of the carbon derivatives lamp black and MWCNT to the nanoscale, antimony-doped tin oxide (ATO) dispersion has only a slight impact on the absorption properties in the ultraviolet and visually visible light range, but that there are significant changes in absorption in the near infrared range.

When one considers the generally very slight absorption of the dried dispersions of both carbon derivatives, it is also evident that it involves not just a purely additive absorption, but that the increased absorption in the near infrared range of light represents a synergistic enhancement effect.

Example 3

Comparison of the UV-VIS-NIR absorptions of dried, binder-containing preparations of the individual components and the heterogeneous mixtures of materials according to this invention FIG. 3 shows the UV-VIS-NIR absorption A of dried binder-containing preparations of the individual components and heterogeneous mixtures of materials according to this invention. Here the absorption curves represent the following binder preparations:

Absorption curve (1): Polymeric binder on quartz glass (coating thickness approx. 1,800 nm)

Absorption curve (2): Polymeric binder with approx. 0.15 weight-% of nanoscale, antimony-doped tin oxide (ATO) on quartz glass (coating thickness approx. 1,800 nm)

Absorption curve (3): Polymeric binder with a mixture according to the invention of approx. 0.006 weight-% MWCNT and approx. 0.15 weight-% nanoscale, antimony-doped tin oxide on quartz glass (coating thickness approx. 1,800 nm)

Absorption curve (4): Polymeric binder with a mixture according to this invention of approx. 0.006 weight-% lamp black and approx. 0.15 weight-% nanoscale, antimony-doped tin oxide (ATO) on quartz glass (coating thickness approx. 1,800 nm)

The absorption spectrums which, following incorporation of the components and the marking compositions of this invention into an approx. 0.2 weight-% polymeric binder dispersion based on polyvinyl pyrrolidone and hydroxyethyl methyl cellulose, were obtained after drying on a quartz glass, and clearly show that for the finely dispersed marking compositions of this invention, obtained from the carbon derivatives lamp black or MWCNT with the nanoscale, antimony-doped tin oxide (ATO) as the infrared-absorbing component, the absorption properties in the UV and visually noticeable light range are only slightly affected, while they are strongly influenced in the near infrared range. It is also seen that here, too, there is not just a purely additive effect, but a synergistic enhancement effect involving absorption in the near infrared light range.

Example 4

Comparison of visual noticeability and infrared contrasts in imprints of binder-containing ink preparations of the individual components and binder-containing ink preparations using the heterogeneous mixtures of materials of this invention on white printer paper.

The ink preparations in this example were produced with the above-described watery binder dispersion based on Hydrosol 900 and, in the comparison example, 5 weight-% nanoscale, antimony-doped tin oxide (ATO) components were added with respect to the solid material portion of the polymeric binder. In the examples of this invention, in addition to the 5 weight-% nanoscale, antimony-doped tin oxide (ATO) component, 50 ppm lamp black (Printex U) and/or 50 ppm MWCNT (Nanocyl NC 7000) were added, each with respect to the solid material portion of the polymeric binder.

For marking compositions that are formulated as marking inks, in particular, the recommended weight relationship between the infrared-absorbing component and the carbon derivative is in the range of approx. 100:1 to approx. 10,000:1. Even when the carbon derivative portion in the marking composition is so extremely low, the present Example 4 shows a marked synergistic effect.

In FIG. 4, the differences between the chromatic color values, measured by means of the X-Rite MA68 colorimeter (X-Rite, Inc.), of the imprints of the ink preparations containing only the nanoscale, antimony-doped tin oxide (ATO) component (white bar) were compared to the differences between the chromatic color values of the imprints of the inks with the finely dispersed mixtures of materials of this invention containing the nanoscale, antimony-doped tin oxide (ATO) sample mixed with lamp black (cross-hatched bar) and/or with MWCNT (black bar) against blank white paper. The angles given as X-Rite measurement geometry hereby reflect, by definition, the angular distance from the glancing angle.

Under normal print conditions, the imprints of the formulations mentioned in the examples are transparent and color-neutral. To allow for visual checking and evaluation by means of color measurements, in this particular example, in each case in connection with the results shown in FIGS. 4 and 5, the imprints as to the number of overprints and the print density (dpi) were performed in such a way that for the imprints from the ink preparations, which contain only the usual nanoscale, antimony-doped tin oxide (ATO) component (comparison example, white bar), a chromatic color value difference ΔE of approx. 1 against the white paper was obtained, at an X-Rite measurement geometry of 45°. The imprints are subsequently weakly visible and so easier to differentiate.

For imprints of inks with the finely dispersed mixtures of materials according to this invention (the examples according to this invention, cross-hatched and black bars), the relevant imprints were performed using analog print parameters, i.e., the number of overprints and the print density (dpi) were the same as for the comparison example that contained only the ATO.

The chromatic color value differences ΔE are shown in FIG. 4 for the visible wavelength range of 400 to 720 nm. As can be seen, the imprints from the inks containing the finely dispersed mixtures of this invention of tin oxide as the infrared-absorbing component with the carbon derivatives, change colors only to a slight degree over several angles of observation.

Figure 5:
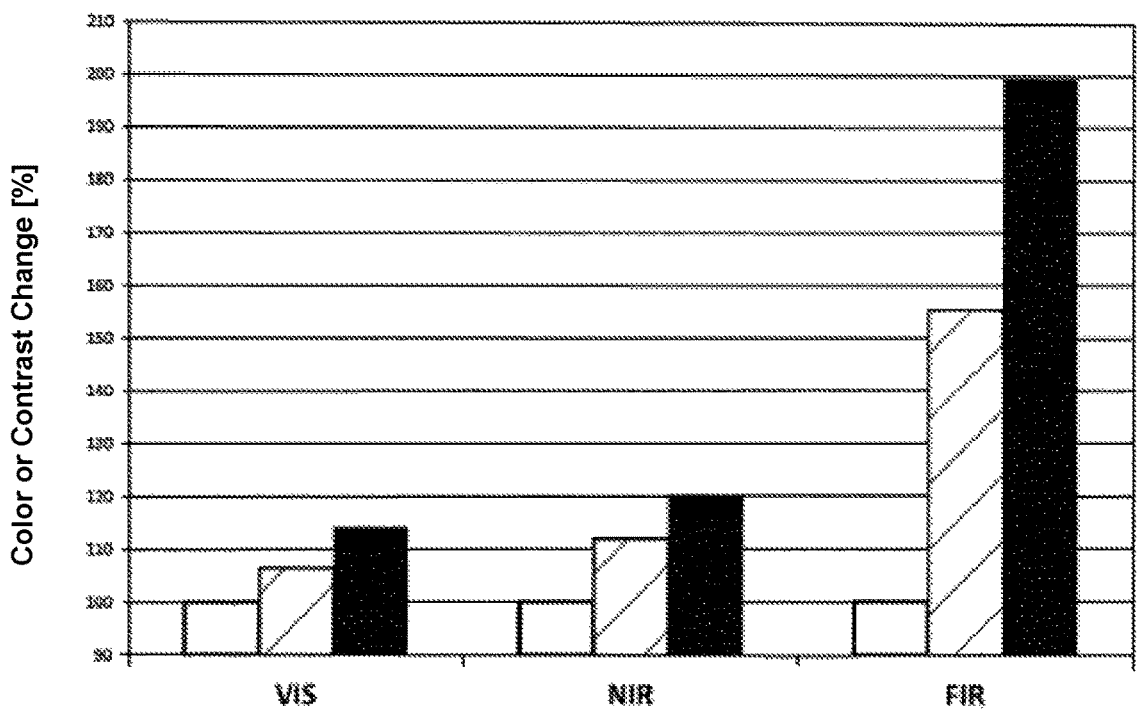

In FIG. 5, based on the imprints described in connection with FIG. 4, the percentage of the color changes in the visible range (VIS: 400 to 720 nm; X-Rite measurement geometry) 110° was compared to the percentage of contrast changes in the near infrared detection range (NIR: 720 to 2,500 nm), obtained upon stimulation in the near infrared range, and the far infrared detection range (FIR: 2.5 to 14 μm).

Values were measured for the following imprints, respectively, by means of suitable infrared cameras:
Ink preparations with the nanoscale, antimony-doped tin oxide (ATO) component (white bar),
Ink preparations containing the finely dispersed mixtures of materials of the nanoscale, antimony-doped tin oxide (ATO) sample according to this invention
with lamp black (cross-hatched bar), and/or
with MWCNT (black bar).

The contrast changes are calculated based on the intensity values, previously determined by means of near infrared and far infrared cameras, using the following formula:

$$\text{Contrast} = \frac{I_{Background} - I_{Marking}}{I_{Background} + I_{Marking}} \cdot 100\%$$

As can be seen, in the visible range of the detection, the color changes and thus the visual noticeability of the imprints behave, in terms of percentages, similar to the achievable contrasts in the near infrared range, but in the far infrared detection range very much higher contrasts are obtained for the marking compositions of antimony-doted tin oxide and the carbon derivatives soot and CNT of this invention.

Particularly for inks containing the mixture with the CNT of this invention, extremely increased far infrared contrasts are obtained when compared to the visually noticeable color changes. When the relevant near infrared absorption of the mixtures of this invention containing soot and CNT in FIG. 3 is compared to the resultant far infrared contrasts in FIG. 5, it is clearly seen that, due to the increased absorption of the mixtures of this invention containing soot or CNT (see FIG. 3), the energy intake by absorption is not the sole reason for the considerable increase in the far infrared contrasts. Rather, the effects of heat conductivity and emissivity, caused by the influence of the soot or CNT components, obviously contribute to the enhanced far infrared contrasts.

The invention claimed is:

1. A marking composition comprising an infrared-absorbing particulate component and a carbon derivative, wherein the marking composition comprises a finely dispersed particulate mixture of the infrared-absorbing particulate component and the carbon derivative, wherein the characteristic value of the particle size $d_{50}$ of the infrared-absorbing particulate component in the particulate mixture is 500 nm or less, wherein the weight ratio of the infrared-absorbing particulate component to the carbon derivative is in the range of approximately 100:1 to approximately 10,000:1, wherein the composition in the form of a fluid mass comprises a solid material portion of the infrared-absorbing particulate component of approximately 0.05 to approximately 1 weight-%, and wherein the marking composition exhibits a synergistic emission in the infrared range as a result of the combination of the infrared-absorbing particulate component and the carbon derivative.

2. The marking composition of claim 1, wherein the infrared-absorbing particulate component is an inorganic material.

3. The marking composition of claim 1 or 2, wherein the infrared-absorbing particulate component contains a tin oxide doped with indium, antimony or fluorine.

4. The marking composition of claims 1, 2, or 3, wherein the carbon derivate is selected from the group consisting of soot, graphite, fullerenes, graphenes, and carbon nanotubes, their derivatives, and their components thereof.

5. The marking composition of any of claims 1 and 2 to 4, wherein the weight ratio of the infrared-absorbing particulate component to the carbon derivative is approximately 100:1 to approximately 2,000:1.

6. The marking composition of any of claims 1 and 2 to 5, wherein the characteristic value of the particle size $d_{50}$ of the infrared-absorbing particulate component in the particulate mixture is approximately 100 nm or less.

7. The marking composition of any of claims 1 and 2 to 6, wherein the carbon derivative is present in the form of nanoparticles that extend in at least one direction by approximately 100 nm or less.

8. The marking composition of any of claims 1 and 2 to 7, wherein the composition contains a liquid component and is formulated as a paste or as a fluid mass with a viscosity of approximately 25 mPa-s or less at room temperature.

9. The marking composition of claim 8, wherein the liquid component has a monomeric, oligomeric and/or a polymeric organic component, wherein the concentration of the organic component is approximately 0.5 to approximately 30 weight-%.

10. The marking composition of any of claims 8, and 9, wherein the organic component is a compound with a molecular weight of approximately 300 to approximately 15,000 g/mol.

11. The marking composition of any of claims 8, 9, and 10, wherein the liquid component comprises one or more polymers and/or copolymers selected from the group consisting of the polymer classes of polyethers, polyvinyl alcohols, polyacrylates, polystyrenes, polyurethanes, polyvinyl caprolactams, cellulose, and polyvinyl pyrrolidones.

12. The marking composition of any of claims 8, and 9 to 11, wherein the composition additionally comprises approximately 0.001 to approximately 5 weight-% of a wetting, dispersing, and/or leveling additive.

13. A solid material composition comprising the marking composition of any of claims 1 and 2 to 7, and a matrix material, wherein the matrix material is selected from the group consisting of organic and inorganic solid materials.

14. The solid material composition of claim 13, wherein the weight ratio of the marking composition is between approximately 0.1 and approximately 30 weight-%.

* * * * *